United States Patent [19]

Stevens

[11] Patent Number: 4,974,684
[45] Date of Patent: Dec. 4, 1990

[54] WALKING BEAM RETAINER
[75] Inventor: Phillip E. Stevens, Ankeny, Iowa
[73] Assignee: Deere & Company, Moline, Ill.
[21] Appl. No.: 485,181
[22] Filed: Feb. 26, 1990
[51] Int. Cl.⁵ .................. A01B 73/04; A01B 63/22
[52] U.S. Cl. ................................. 172/311; 172/413; 172/481; 280/677
[58] Field of Search .............. 172/310, 311, 386, 395, 172/413, 421, 456, 481, 776; 280/677, 704

[56] References Cited
U.S. PATENT DOCUMENTS

| 3,262,715 | 7/1966 | Abbott | 280/677 X |
| 3,552,764 | 1/1971 | Schwartz | 280/677 |
| 3,948,327 | 4/1976 | Parker et al. | 172/311 |
| 4,846,084 | 7/1989 | Sigle | 172/310 X |

OTHER PUBLICATIONS

White Farm Equipment Sales Brochure, "220 Series Field Cultivators", Jan. 1988.
Krause Sales Brochure, "4100 Series Flex-Wing Field Cultivator", 1977.
Glencoe Sales Brochure, "W300 Series Field Cultivator", Sep. 1979.

Primary Examiner—Randolph A. Reese
Assistant Examiner—Jeffrey L. Thompson

[57] ABSTRACT

A wheel arrangement includes a retainer mechanism with a spring-loaded pin mounted on the walking beam of a support wheel assembly on a folding implement. A mating retainer supported on the wheel support tube is normally offset from the pin when the implement is in the lowered field-working position. As the implement is raised toward the transport position and the angle of the beam changes relative to the support tube, the pin settles in a central notch in the retainer. The retainer mechanism maintains a preselected angle between the beam and the support tube as the outrigger is moved upwardly and the outrigger wheels are raised from the ground, thereby preventing unwanted rocking of the walking beam during transport and maintaining the wheels in a noninterfering relationship with other portions of the implement.

9 Claims, 2 Drawing Sheets

WALKING BEAM RETAINER

BACKGROUND OF THE INVENTION

(1) Field of the Invention:

The present invention relates generally to folding agricultural implements and, more specifically to structure for preventing rocking of the wing support wheels on such implements when the wings are folded for transport.

(2) Related Art:

Tillage equipment such as field cultivators and chisel plows are available with multi-sectioned frames with outriggers which fold upwardly to narrow the implements for transport. The outriggers usually include a walking beam arrangement supporting two wheels. Since the walking beam is free to rotate when the outrigger frames are in the transport position, there is often unwanted movement of the wheels as the implement is transported. Interference between the tires and wheels of one outrigger and parts on the opposite outrigger can occur during transport as well as during rocking of the outriggers between transport and field-working positions.

BRIEF SUMMARY OF THE INVENTION

It is therefore an object of the invention to provide an improved walking beam arrangement for an implement. It is a further object to provide such an arrangement which overcomes the aforementioned problems.

It is yet another object to provide an improved walking beam arrangement for an implement including a retaining mechanism which limits free rocking of the walking beam when the implement is in the transport position. It is a further object to provide such an arrangement wherein the retaining mechanism works automatically without operator assistance. It is another object to provide such a walking beam arrangement which is relatively simple and inexpensive and yet reliable in operation.

It is a further object of the invention to provide an improved walking beam arrangement for the support wheels of an outrigger on a folding implement which eliminates wheel interference and unwanted rocking of the walking beam when the outrigger is folded to the transport position. It is another object to provide such an arrangement which works automatically to secure the beam against rocking during transport and to permit normal rocking action when the wheels are supporting the implement.

A wheel arrangement constructed in accordance with the teachings of the present invention includes retainer mechanism with a spring-loaded pin mounted on the walking beam of a support wheel assembly on a folding implement. A mating retainer is supported on the rockshaft support tube and is offset from the pin when the implement is in the lowered field-working position. As the implement is raised toward the transport position and the angle of the beam changes relative to the support tube, the pin contacts the retainer and is urged inwardly against the bias. The pin settles in a recess or notch in the retainer as the implement reaches the fully raised position. Thereafter, the pin maintains the same angular relationship between the beam and the support tube as the outrigger is moved upwardly and the outrigger wheels are raised from the ground. The pin prevents unwanted rocking of the walking beam during transport and maintains the beam in a position which prevents interference with another portion of the implement such as the outrigger wheels on the opposite side of the implement.

As the implement is unfolded toward the working position and the wheels contact the ground, the recess or notch, which includes a camming surface, urges the pin against the bias to release the walking beam for normal rocking action. The pin bias is sufficient to prevent rocking of the beam when the wheels are removed from the ground but not so heavy as to impede rocking of the beam when one or both wheels on the beam contact the ground. The pin is offset from the retainer when the implement is in the normal field-working position to reduce wear on the camming surfaces. The mechanism is relatively simple and inexpensive in construction, and operation of the retainer mechanism is automatic both during folding and unfolding of the implement. The operator does not have to leave the seat of his tractor or manipulate hydraulic controls to use the retainer mechanism.

These and other objects, features and advantages of the present invention will become apparent to one skilled in the art upon reading the following detailed description in view of the drawings.

DETAILED DESCRIPTION OF THE DRAWINGS

Figure 1:
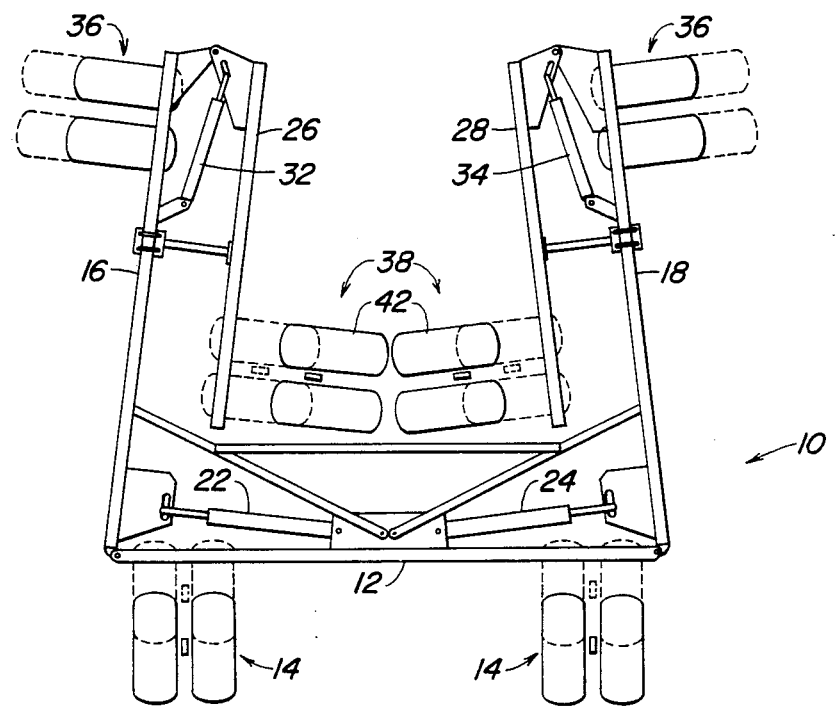
FIG. 1 is a view of a folding implement including outriggers adapted for support by wheel assemblies with walking beams.

Referring now to FIG. 1, therein is shown a tillage implement 10 such as a field cultivator or chisel plow having a main frame 12 supported by vertically adjustable ground engaging wheel assemblies 14. Inboard wing or outrigger frames 16 and 18 are pivotally connected to the main frame 12 for rocking about fore-and-aft extending axes by cylinders 22 and 24 between upright transport positions (shown) and extended field-working positions parallel to the ground surface. Outboard wings or outriggers 26 and 28 are pivotally connected to the respective inboard wing frames 16 and 18 for rocking by cylinders 32 and 34 between folded positions (shown) generally parallel to the corresponding inboard wing frames and unfolded working positions. Wheel assemblies 36 and 38 support the outriggers 16,18 and 26,28, respectively, when the implement 10 is unfolded. The wheel assemblies 38 include wheels 42 which project inwardly toward the opposite wing in the transport position (see FIG. 1) and which can interfere with each other or with other components on the implement during folding and transport in the folded position.

Figure 2:
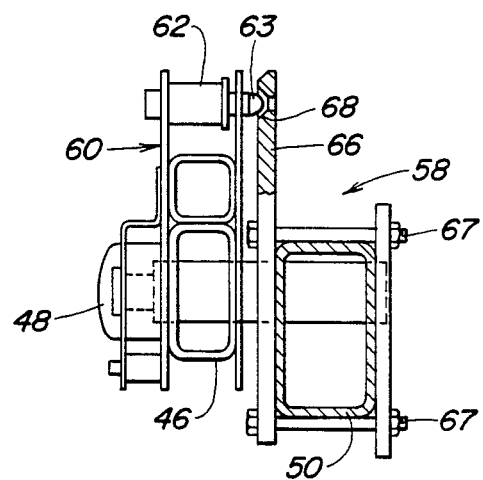
FIG. 2 is an enlarged view of the beam retainer mechanism utilized with the wheel assembly of FIG. 1.
Figure 3:
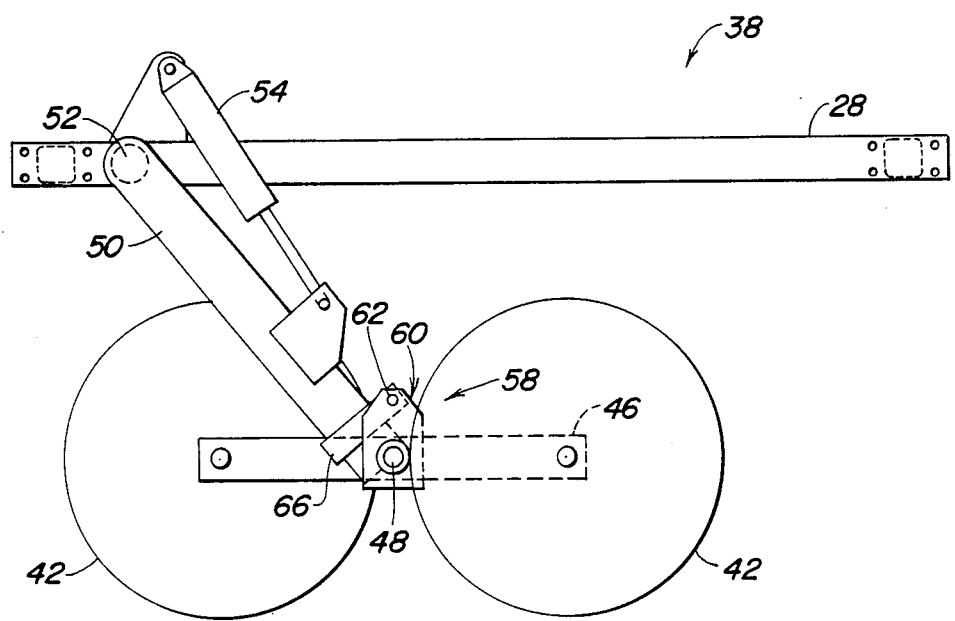
FIG. 3 is an enlarged side view of a wheel assembly utilized on the implement of FIG. 1 and showing the wheel assembly support tube in the lowered transport position.
Figure 4:
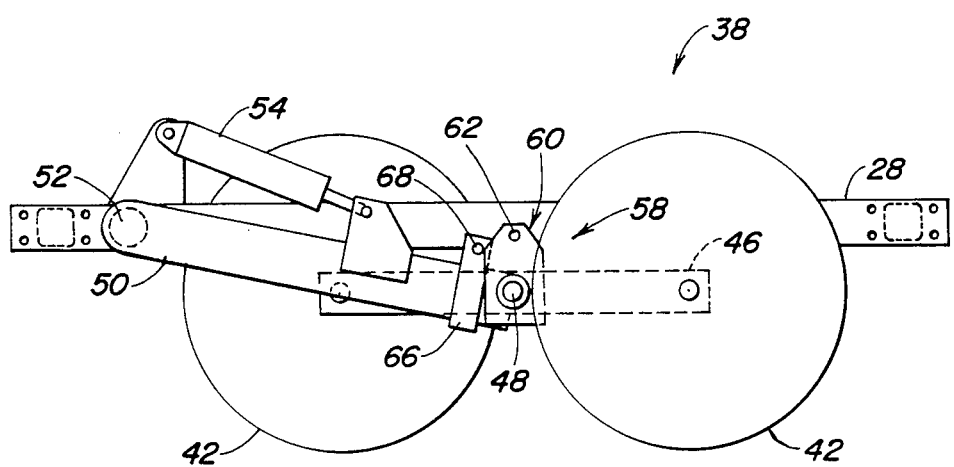
FIG. 4 is a view similar to FIG. 3 but showing the support tube raised to the field-working position.

The wheel assemblies 36 and 38 include a fore-and-aft extending walking beam 46 (FIG. 2) pivotally connected at a central location 48 to the lower end of a support tube 50 for freely rocking about a transverse axis. The upper end of the support tube 50 is pivotally connected at location 52 to the corresponding outrigger (28 as shown in FIGS. 3 and 4) for rocking vertically about a transverse axis, between a lowered transport position and a raised field-working position, by a lift cylinder 54. The cylinder 54 is connected to a source of hydraulic fluid on the tractor (not shown) for operation with the cylinders connected to the remaining wheel assemblies on the implement 10.

As can be appreciated from FIGS. 3 and 4, the angle between the walking beam 46 and the support tube 50 changes as the tube 50 is rocked vertically about location 52 by the cylinder 54. When the tube 50 is lowered to raise the frame 28, the beam 46 is rockable relative to the tube 50 over a first range of values. As the tube 50 is lifted to lower the frame 28 into a field-working position, the angle between the tube 50 and the beam 46 decreases. A retainer mechanism 58 is supported by the tube 50 and beam 46 and advantageously utilizes this change in angular relationship to maintain the beam 46 at a preselected angle relative to the tube 50 during transport.

A pin support bracket 60 is fixed to and extends upwardly from the walking beam 46 adjacent the pivot 48. A springbiased pin 62 with a tapered projecting end 63 is supported by the bracket 60 and is biased toward the support tube 50. A recessed or notched retainer plate 66 is fixed to the support tube 50 by bolts 67 at a location offset slightly from the pivotal axis of the walking beam 46. The pin end 63 moves through an arc-shaped path relative to the tube 50 as the walking beam 46 rocks about the pivot 48. The plate 66 extends upwardly and generally aligns with the spring-biased pin 62 when the support tube 50 is lowered by the cylinder 54 (FIG. 3) to raise the frame 26. A tapered recess or notch 68 in the plate 66 (FIG. 2) which lies generally along the arc-shaped path receives the tapered end 63 of the pin 62 therein at a preselected angular relationship between the beam 46 and the tube 50 (FIG. 3).

When the walking beam 46 rocks as the lowered wheels 42 move over ground irregularities, the taper in the recess or notch 68 of the plate 66 acts against the tapered pin end 63 to cam the pin 62 inwardly against the bias so there is relatively unrestricted pivotal movement between the walking beam 46 and the support arm 50 for good contour following ability. However, when the outriggers are folded so that the wheels 42 no longer contact the ground, the retaining action of the spring-biased pin 62 seated in the notch 68 prevents rocking of the walking beam 46 relative to the support arm 50 to maintain the wheels in a preselected position during folding and during transport in the folded (FIG. 1) position. Therefore, unwanted rocking of the wheels and interference between each wheel assembly and other components on the machine is eliminated.

As the implement 10 is unfolded from the position shown in FIG. 1 and the wheels 42 contact the ground, the pin 62 is automatically cammed out of the notch 68 as necessary to allow both the wheels to contact the ground, since the pin bias is insufficient to hold the walking beam 46 in such a manner that only one wheel is supporting the outrigger. When the tube 50 is raised (FIG. 4) to lower the outrigger to the field-working position, there is sufficient change in the angular relationship between the beam 46 and the tube 50 to prevent unwanted interaction between the pin 62 and the bracket 60. However, as the outrigger is raised by lowering the tube 50, the pin 62 and bracket 60 again move adjacent to each other so that the pin end 63 is poised to be captured in the notch 68 when the outrigger is folded and the wheels 42 are lifted from the ground. If desired, several notches 68 can be located in the bracket 60 along the path of the pin 62 to facilitate capture of the pin end 63, particularly when the outrigger is folded with the beam 46 in a position other than the normal level position shown in FIG. 3.

Having described the preferred embodiment, it will become apparent that various modifications can be made without departing from the scope of the invention as defined below.

I claim:

1. In a foldable agricultural implement having a frame; an outrigger portion having a support wheel assembly and movable between an unfolded position wherein the wheel assembly supports the outrigger portion and a folded position wherein the wheel assembly is raised off the ground; the wheel assembly including a walking beam supporting at least two wheels, a rockable support tube having an upper end pivotally connected to the outrigger portion and a lower end pivotally supporting the walking beam; means for rocking the support tube between a raised field-working position and a lowered lift position, whereby when the outrigger is in the unfolded position the walking beam pivots to maintain the wheels in ground contact; and a retaining mechanism for limiting rocking of the walking beam when the wheel assembly is raised off the ground comprising: a first retainer member supported on the walking beam, a mating retainer member supported on the support tube, and means yieldingly biasing the retainer members into contact with each other for preventing pivotal movement of the walking beam relative to the support tube when the wheels are in non-contacting relationship to the ground and allowing rocking of the beam relative to the tube when the wheels contact the ground.

2. The invention as set forth in claim 1 including means supporting the retainer members in offset, non-contacting relationship relative to each other when the support tube is in the raised field-working position, said means supporting the retainer members causing the members to move towards each other as the support tube is lowered to the lift position.

3. The invention as set forth in claim 1 wherein the first and mating retaining members include a spring-biased pin and a bracket having a recess for releasably receiving the pin.

4. The invention as set forth in claim 3 wherein the walking beam generally assumes first and second angular positions with respect to the support tube when the support tube is in the respective lowered and raised positions, wherein in the second angular position the pin is offset from the recess in the bracket.

5. The invention as set forth in claim 4 wherein the pin is supported on the walking beam and the bracket is supported on the support arm, the pin traversing an arc-shaped path as the walking beam rotates with respect to the support tube, and wherein the recess is located along the arc-shaped path.

6. The invention as set forth in claim 5 wherein the pin is located above the pivotal connection of the walking beam with the support tube.

7. In a wheel assembly for an implement, the assembly adapted for both supporting the implement in an operative configuration and for being supported out of ground contact in a road transport position, the assembly having a fore-and-aft extending walking beam, first and second ground wheels connected for rotation about transverse axes at the opposite ends of the beam, a downwardly extending and vertically rockable lift arm, and means pivotally connecting the walking beam at a central location between the wheels to the lower end of the lift arm for rocking over ground irregularities when the implement is in the operative position, a retaining mechanism for limiting the free rocking of the walking beam when the implement is in the transport position, comprising:

a retainer;

a retainer pin;

means for supporting the retainer and retainer pin from the lift arm and walking beam for relative angular movement with respect to each other as the beam rocks relative to the arm; and means releasably biasing the pin and retainer into contact in at least one preselected relative angular position of the beam relative to the arm for preventing relative rotation between the beam and the arm when the wheel assembly is out of ground contact, while allowing relative rotation between the beam and arm automatically as one or both of the ground wheels contact the ground.

8. The invention as set forth in claim 7 wherein the means releasably biasing includes spring means for yieldingly urging the pin towards the retainer, and the retainer includes at least one recessed portion for receiving the pin when the beam is at a preselected position relative to the arm.

9. The invention as set forth in claim 7 wherein the arm and walking beam have a general range of relative angular positions when the arm is rocked to a field-operating position, and wherein the pin and retainer are offset angularly from each other over at least a substantial portion of said general range to reduce friction and wear in the retaining mechanism during field operations when the wheels are in contact with the ground.

* * * * *